United States Patent [19]

Wickson et al.

[11] Patent Number: 5,184,531
[45] Date of Patent: Feb. 9, 1993

[54] SPRINKLER BROKEN TUBE REMOVAL APPARATUS

[76] Inventors: Leonard Q. Wickson; Dianne M. Wickson, both of 1437 Cottonwood St., Ontario, Calif. 91761

[21] Appl. No.: 858,043

[22] Filed: Mar. 26, 1992

[51] Int. Cl.⁵ .................................. B25F 1/00
[52] U.S. Cl. .............................. 81/441; 7/157
[58] Field of Search ............... 81/441, 488, 53.2; 7/165, 157; 29/253

[56] References Cited

U.S. PATENT DOCUMENTS

| | | | |
|---|---|---|---|
| 3,731,364 | 5/1973 | Romero | 29/261 X |
| 3,952,618 | 4/1976 | Seamon | 81/441 |
| 3,977,063 | 8/1976 | Bruninga | 81/119 X |
| 4,503,737 | 3/1985 | DiGiovanni | 81/441 |
| 4,553,280 | 11/1985 | Stright | 7/157 |
| 4,788,894 | 12/1988 | Mitschele | 81/488 |
| 4,866,801 | 9/1989 | Lamar | 29/253 X |

Primary Examiner—D. S. Meislin
Attorney, Agent, or Firm—Leon Gilden

[57] ABSTRACT

A tool member is arranged for ease of removal of broken sprinkler tubes typically formed of PVC pipe. The tool structure includes an elongate plate having a handle orthogonally mounted adjacent an upper distal end thereof. Projecting to the lower distal end from the spaced sides of the plate are canted side extensions defining an acute angle therebetween for projection into a broken conduit portion permitting its rotative threaded disengagement relative to the sprinkler structure. A modification of the invention includes a saw blade arranged for ease of severing of fluid conduit, as well as an extractor structure arranged for impact extraction of the broken tubular portion.

2 Claims, 4 Drawing Sheets

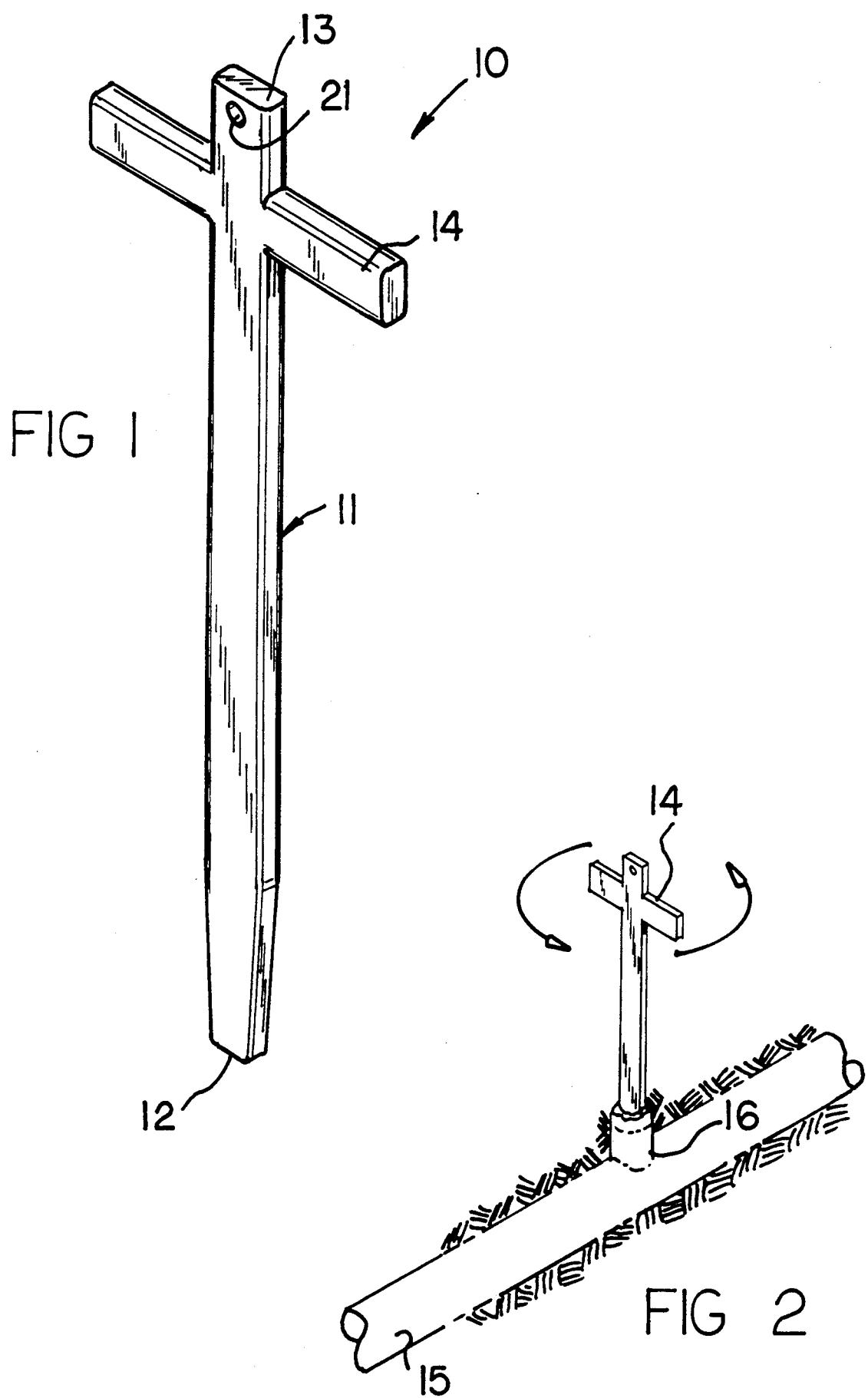

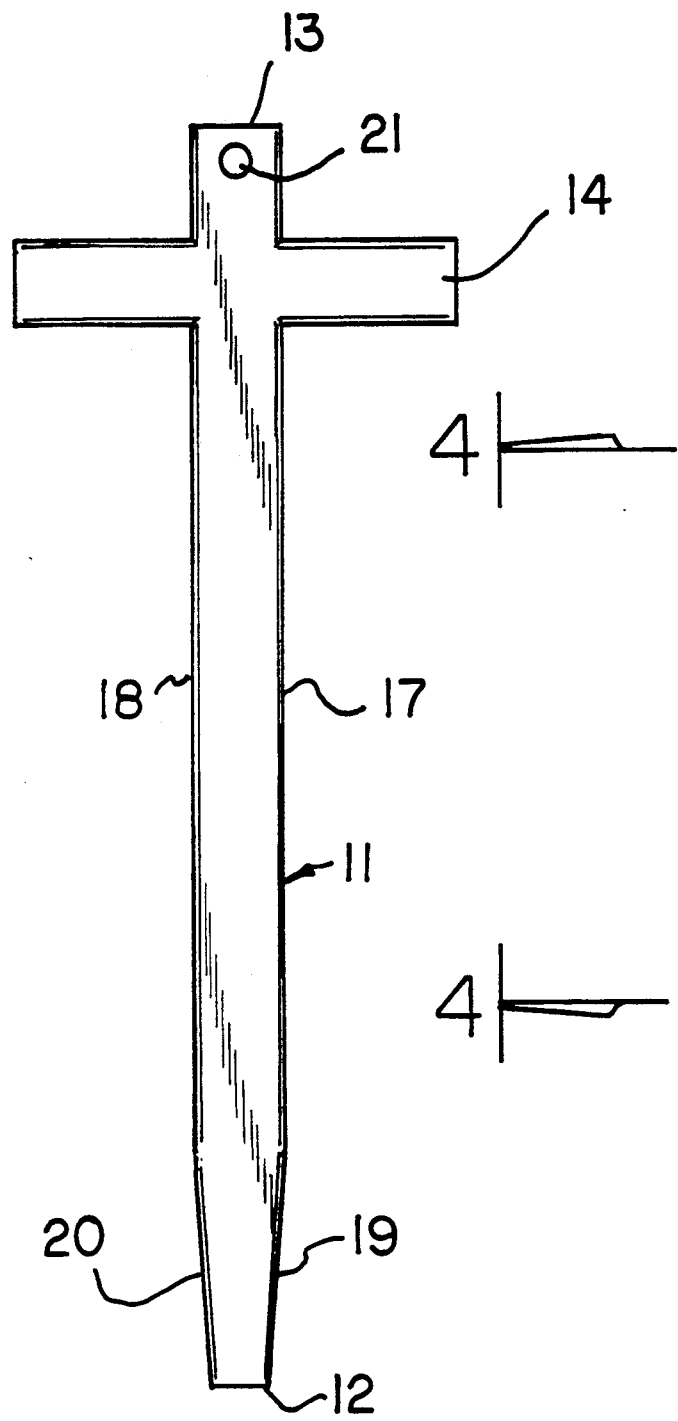
FIG 3
FIG 4

SPRINKLER BROKEN TUBE REMOVAL APPARATUS

BACKGROUND OF THE INVENTION

1. Field of the Invention

The field of invention relates to tool apparatus, and more particularly pertains to a new and improved sprinkler broken tube removal apparatus for ease of removal of broken fluid conduit portions within existing fluid conduit sprinkler structure.

2. Description of the Prior Art

Sprinkler conduits tpically contained in a subterranean orientation are of limited access to individuals upon removal of broken conduit portions having been typically affixed to sprinkler heads or further conduit tube extensions of a primary tubular conduit. The instant invention attempts to overcome deficiencies of the prior art by providing a tool structure of complete combination to permit ease of removal of broken conduit portions within a primary fluid conduit of a sprinkler system. Prior art U.S. Pat. No. 4,788,894 to Mitschele sets forth a hand tool for removal of underground sprinkler heads, wherein the tool structure includes a cutting tool arranged for surrounding relationship relative to a sprinkler head for providing access to the sprinkler head.

U.S. Pat. No. 4,866,801 to Lamar sets forth a sprinkler riser extractor tool, including bifurcated jaws arranged for mounting to a sprinkler head structure.

U.S. Pat. Nos. 3,977,063 to Buringa and 3,731,364 to Romero set forth further examples of sprinkler tool structure arranged for the maintenance of sprinkler systems and ease of removal of pipe and head structure thereto typically of a complex structure not contemplated by the instant invention.

Accordingly, it may be appreciated that there continues to be a need for a new and improved sprinkler broken tube removal apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of sprinkler tool apparatus now present in the prior art, the present invention provides a sprinkler broken tube removal apparatus wherein the same is arranged for ease of removal of conduit tube portions threadedly mounted within a primary sprinkler conduit. As such, the general purpose of the present invention, which will be described subsequently in greater detail, is to provide a new and improved sprinkler broken tube removal apparatus which has all the advantages of the prior art sprinkler tool apparatus and none of the disadvantages.

To attain this, the present invention provides a tool member arranged for ease of removal of broken sprinkler tubes typically formed of PVC pipe. The tool structure includes an elongate plate having a handle orthogonally mounted adjacent an upper distal end thereof. Projecting to the lower distal end from the spaced sides of the plate are canted side extensions defining an acute angle therebetween for projection into a broken conduit portion permitting its rotative threaded disengagement relative to the sprinkler structure. A modification of the invention includes a saw blade arranged for ease of severing of fluid conduit, as well as an extractor structure arranged for impact extraction of the broken tubular portion.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sprinkler broken tube removal apparatus which has all the advantages of the prior art sprinkler tool apparatus and none of the disadvantages.

It is another object of the present invention to provide a new and improved sprinkler broken tube removal apparatus which may be easily and efficiently manufactured and marketed.

It is a further object of the present invention to provide a new and improved sprinkler broken tube removal apparatus which is of a durable and reliable construction.

An even further object of the present invention is to provide a new and improved sprinkler broken tube removal apparatus which is susceptible of a low cost of manufacture with regard to both materials and labor, and which accordingly is then susceptible of low prices of sale to the consuming public, thereby making such sprinkler broken tube removal apparatus economically available to the buying public.

Still yet another object of the present invention is to provide a new and improved sprinkler broken tube removal apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the instant invention in use.

FIG. 3 is an orthographic view, taken in elevation, of the invention.

FIG. 4 is an orthographic view, taken along the lines 4—4 of FIG. 3 in the direction indicated by the arrows.

DESCRIPTION OF THE PREFERRED EMBODIMENT

Figure 5:
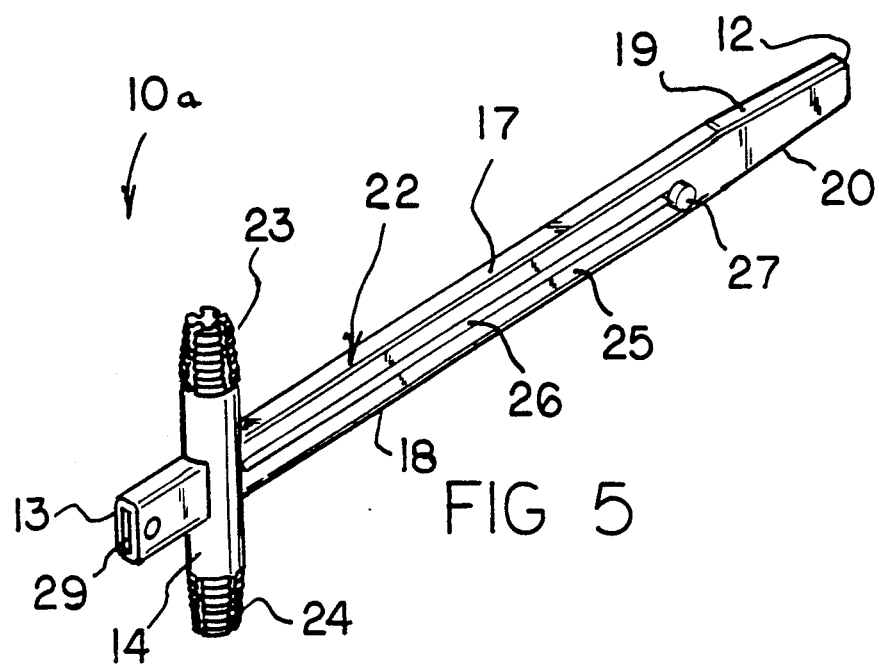
FIG. 5 is an isometric illustration of a modified aspect of the invention.

With reference now to the drawings, and in particular to FIGS. 1 to 8 thereof, a new and improved sprinkler broken tube removal apparatus embodying the principles and concepts of the present invention and generally designated by the reference numerals 10, 10a, and 10b will be described.

More specifically, the sprinkler broken tube removal apparatus 10 of the instant invention essentially comprises an elongate longitudinally aligned plate 11, including a plate lower distal end 12 oriented parallel relative to a plate upper distal end 13. Handle member 14 is orthogonally and integrally mounted to the plate 11 spaced from and adjacent the upper distal end 13. The plate 11 includes a first upper side 17 spaced from and parallel a second upper side 18 in a coextensive relationship, wherein the first and second upper sides 17 and 18 are spaced from the lower distal end 12 a predetermined length, with the upper first and second sides 17 and 18 orthogonally oriented relative to the lower distal end 12. A first and second canted side 19 and 20 extending from the first and second upper sides 17 and 18 extend towards and intersect the lower distal end 12 defining an acute included angle between the first and second canted sides 19 and 20. In this manner, the first and second canted sides 19 and 20 are arranged for projection into an intersecting conduit 16 of a fluid primary conduit 15 typically formed of PVC tubing. In this manner, the tubing is arranged for deflection in an interference fit between the first and second canted sides 19 and 20 to remove a broken threaded portion within the intersecting conduit 16. For ease of storage of the organization, a mounting bore 21 is directed through the plate 11 between the handle member 14 and the upper distal end 13.

Figure 6:
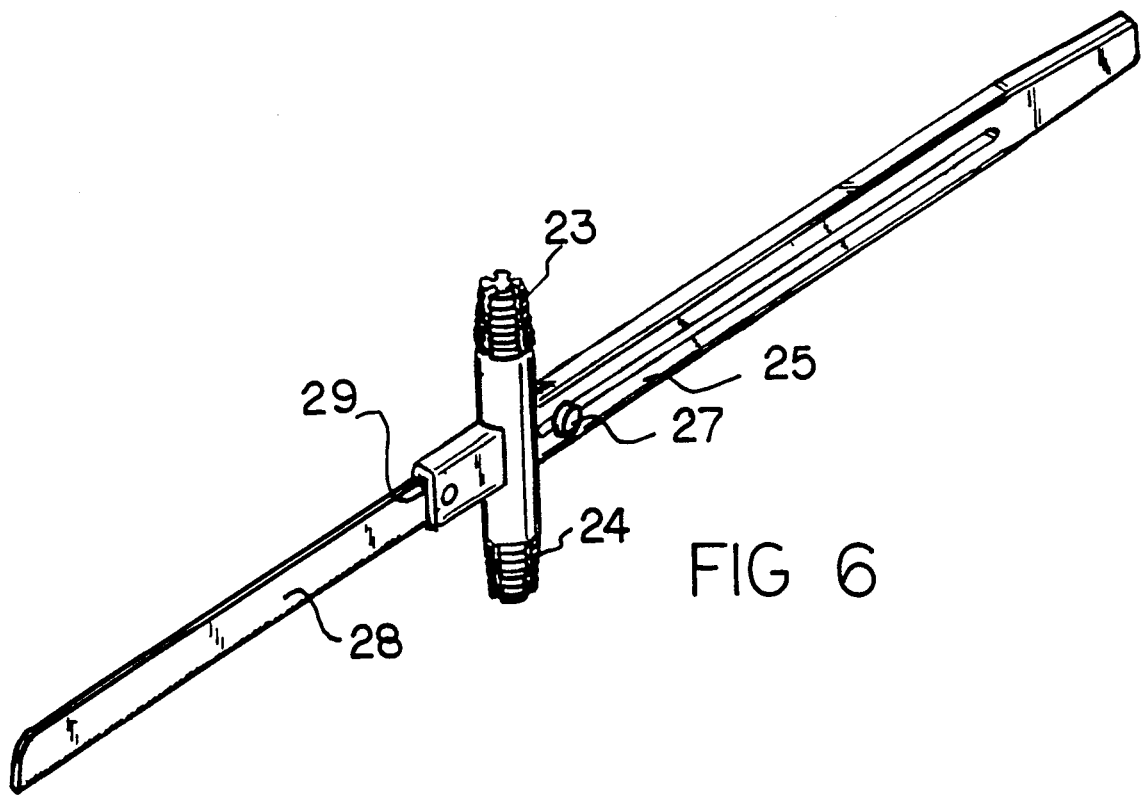
FIG. 6 is an isometric illustration of the modified aspect of the invention illustrating a saw blade in an extended operative orientation.
Figure 8:
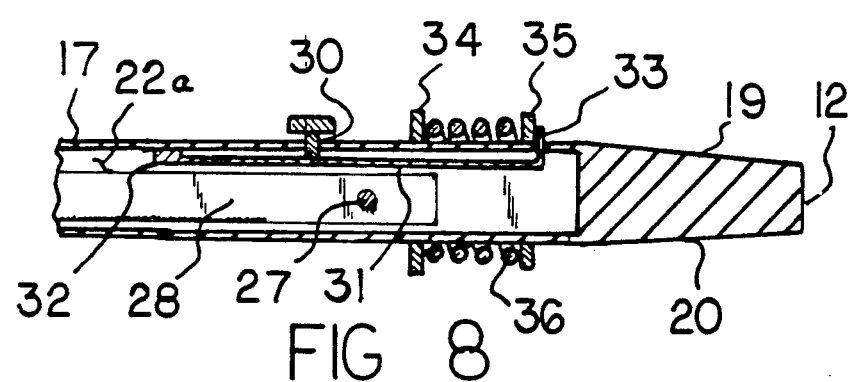
FIG. 8 is an orthographic view, taken along the lines 8—8 of FIG. 7 in the direction indicated by the arrows.

The FIGS. 5 and 6 illustrate a modified apparatus 10a, including the plate 11 configured as a tubular plate housing 22. The upper distal end 13 includes an upper end opening 29 directed therethrough in communication with a housing cavity 22a of a type such as illustrated in FIG. 8, receiving telescopingly within the plate house 22 a saw blade 28. The saw blade 28 includes a slider member 27 orthogonally and fixedly mounted adjacent a rear distal end of the saw blade 28, with the slider member 27 slidably received through a plate housing top wall 25 and more specifically, a top wall slot 26 directed between the handle member 14 and the first and second canted sides 19 and 20. In this manner, the saw blade 28 is arranged for projection relative to the plate housing 22 for ease of severing of PVC tubing as required. Further, the handle member 14 is configured to include a respective first and second thread tap end 23 and 24 respectively formed as respective first and second national pipe thread sizes of varying dimensions to permit the cleaning and aligning of existing threads within PVC type conduit typically utilized in sprinkler systems.

Figure 7:
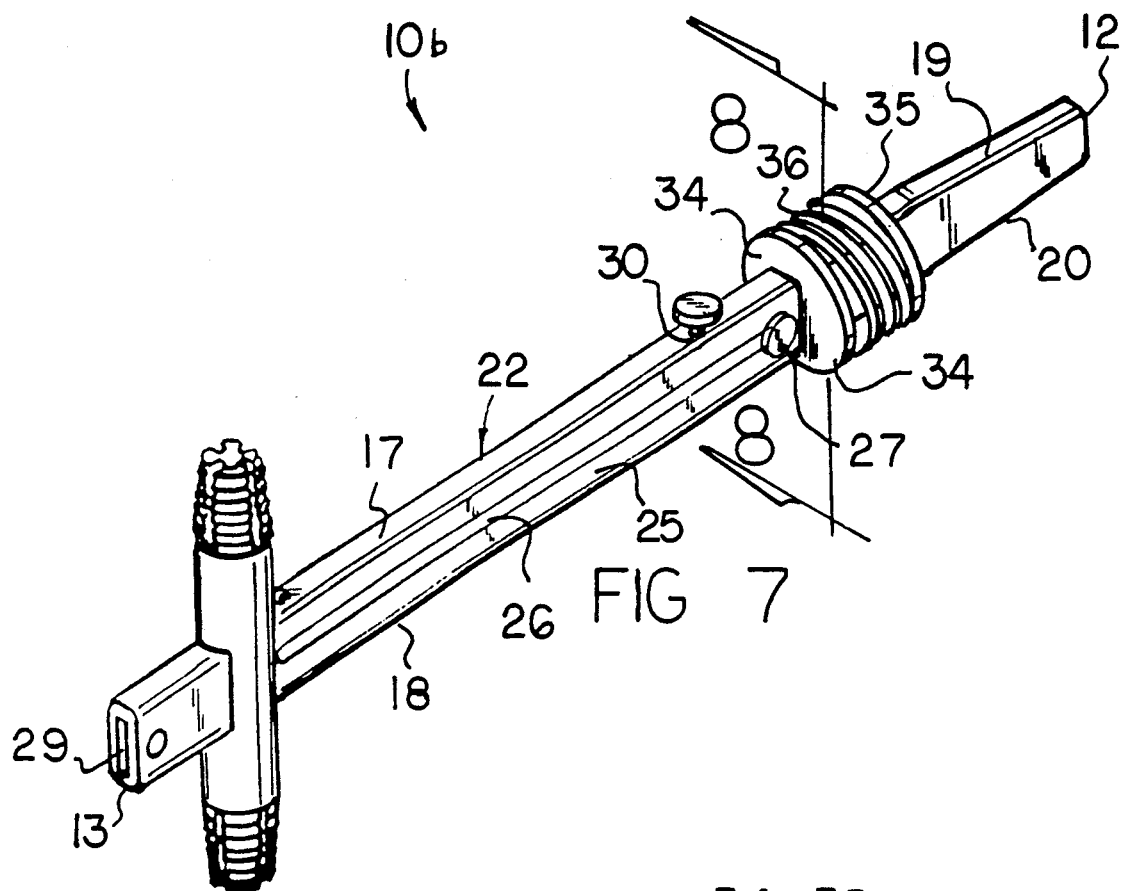
FIG. 7 is an isometric illustration of a further modified aspect of the invention.

The FIGS. 7 and 8 illustrate a further aspect of the invention 10b incorporating the organization as set forth in the FIGS. 5 and 6, but to further include a plunger rod 30 reciprocatingly mounted through the first upper side 17 adjacent the first canted side 19 fixedly mounted to a spring blade 31 within the housing cavity 22a. The spring blade 31 includes a blade rear distal end 32 fixedly mounted within the housing cavity 22a rearwardly of the plunger rod 30, with a forward distal end 33 of the spring blade 31 projecting through the first upper side 17 forwardly of the plunger rod 30. The tubular plate housing 22 includes a rear abutment flange 34 fixedly mounted in surrounding relationship relative to the plate housing 22 between the plunger rod 30 and the spring blade forward distal end 33. A forward impact plate 35 is slidably mounted about the housing 22, with a impact spring 36 captured between the forward impact plate 35 and the rear abutment flange 34. The forward distal end 33 of the spring blade 31 is arranged for selective abutment forwardly of the forward impact plate 35, whereupon depressing the plunger rod 30 slidably projects the spring blade forward distal end 33 within the housing cavity 22a releasing the forward impact plate 35 for projection onto an intersecting conduit portion 16, of a type such as illustrated in FIG. 2, to ease removal of a broken nipple portion within such a conduit 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and eguivalents may be resorted to, falling within the scope of the invention.

What is claimed as being new and desired to be protected by Letters Patent of the United States is as follows:

1. A sprinkle broken tube removal apparatus, comprising, an elongate plate housing, the plate housing including a lower distal end spaced from an upper distal end, the plate housing including a first upper side spaced from, parallel to, and coextensive with a second upper side, wherein the first upper side and the second upper side extend along the plate housing terminating in a spaced relationship relative to the lower distal end, with the first upper side and the second upper side orthogonally oriented relative to the lower distal end, and a handle member orthogonally and fixedly directed through the first upper side and the second upper side, and the plate housing further including a first canted side directed from the first upper side to the lower distal end, and a second canted side directed from the second upper side to the lower distal end, wherein the first canted side and the second canted side define an acute angle therebetween, and the handle member includes a first threaded tap end of a first size and a second threaded tap end of a second size on opposed handle ends of the handle, and the plate housing includes a housing top wall between the first upper side and the second upper side, and a top wall slot longitudinally directed through the plate housing between the first upper side and the second upper side, with the housing including a housing cavity directed coextensively through the plate housing from the upper distal end to the first canted side and the second canted side, with the housing cavity in communication with the top wall slot, and a slider member slidably mounted within the top wall slot, and a saw blade slidably mounted within the housing cavity, with the slider member fixedly mounted to the saw blade adjacent a rear distal end of the saw blade, and the upper distal end including an upper end opening permitting projection of the saw blade exteriorly of the housing upon projection of the slider member along the top wall slot.

2. An apparatus as set forth in claim 1 wherein a plunger rod is slidably directed through the first upper side adjacent the first canted side in a spaced relationship relative to the first canted side, wherein a spring blade is mounted within the housing cavity, the spring blade including a spring blade rear distal end and a spring blade forward distal end, with the plunge rod fixedly mounted to the spring blade between the spring blade rear distal end and the spring blade forward distal end, and the spring blade rear distal end fixedly mounted to the plate housing in surrounding relation- plunger rod, and the spring blade forward distal end slidably projecting through the upper side forwardly of the plunger rod, and a rear abutment flange fixedly mounted to the plate housing in surrounding relationship thereto between the top wall slot and the spring blade forward distal end, and a forward impact plate slidably mounted in surrounding relationship relative to the plate housing, with an impact spring mounted between the forward impact plate and the rear abutment flange, whereupon projection of the plunger rod into the housing cavity effects displacement of the spring blade forward distal end into the housing cavity releasing the forward impact plate for projection along the plate housing.

* * * * *